United States Patent [19]

Joesting

[11] 4,090,467
[45] May 23, 1978

[54] CONTROL POINT ADJUSTMENT MECHANISM

[75] Inventor: Frederick D. Joesting, Park Ridge, Ill.

[73] Assignee: Honeywell Inc., Minneapolis, Minn.

[21] Appl. No.: 700,633

[22] Filed: Jun. 28, 1976

[51] Int. Cl.² ............ G01D 13/00; G05B 23/00; G09F 9/00

[52] U.S. Cl. ............ 116/129 T; 73/432 A; 116/136.5; 137/552

[58] Field of Search ............ 116/129 F, 129 T, 133, 116/136.5; 73/432 A; 91/1, 3, 5; 137/85, 227, 505.41, 552

[56] References Cited

U.S. PATENT DOCUMENTS

| | | | |
|---|---|---|---|
| 1,387,991 | 8/1921 | Kunke et al. | 137/227 |
| 1,530,094 | 3/1925 | Ryan | 137/505.41 X |
| 2,408,795 | 10/1946 | McGlone | 91/1 X |
| 2,735,669 | 2/1956 | Seiler | 137/505.41 X |
| 2,907,931 | 10/1959 | Moore, Jr. | 73/432 A X |
| 3,315,250 | 4/1967 | Higgins, Jr. | 137/85 X |
| 3,469,559 | 9/1969 | Mulley | 116/129 R |
| 3,707,676 | 12/1972 | Bretagne et al. | 116/129 R X |
| 4,024,767 | 5/1977 | Kamf | 73/432 A |

Primary Examiner—Daniel M. Yasich
Attorney, Agent, or Firm—Trevor B. Joike

[57] ABSTRACT

An apparatus is disclosed for use in a control system having a control point adjustment and a throttling range adjustment, the apparatus having, for example, a first dial having a throttling range pointer attached thereto, a second dial having throttling range indicia and control point indicia thereon, a control point pointer for cooperating with the control point indicia, a shaft connecting the first dial to the control point adjustment and a locking screw for locking the first and second dials together so that the first and second dials rotate in unison for changing the control point of the system and for unlocking the first and second dials so that the first dial can be rotated to change the control point to compensate for any adjustments in the throttling range of the control system.

8 Claims, 8 Drawing Figures

CONTROL POINT ADJUSTMENT MECHANISM

BACKGROUND OF THE INVENTION

This invention relates to an apparatus to compensate for a change in control point of a control system which results when the throttling range of the control system is changed.

In typical condition control systems, the output from a condition sensor is compared to a reference level established by a control point adjustment and an error signal is generated dependent upon the difference between the sensor output and the control point or setpoint adjustment output. This error signal is then used to control a load for, in turn, controlling the condition. The throttling range, sometimes referred to as the proportional band, of the system determines the impact that the error signal will have on the load. For example, in a control system where the load is a motor which may drive a valve, the throttling range of the system may be adjusted to insure that the motor will operate to its mid position as a result of a predetermined error signal. However, the throttling range can be changed to drive the motor to one of its extreme positions for the same predetermined error signal. Thus, the throttling range can be set for best system performance.

Although it is apparent that the incorporation of a throttling range adjustment in a control system has certain advantages, it does have at least one disadvantage in the typical control system. Specifically, a change in throttling range typically results in a change in the control point of the system. In such a system, when the throttling range is changed, the operator must also make a change in the control point of the system to compensate for the change in throttling range. However, the operator may not know how much to change the control point for a change in throttling range.

One prior art solution to this problem is to provide, in addition to the throttling range adjustment and the control point adjustment, a third element connected in circuit with the control point adjustment and the throttling range adjustment. The third element is operated in conjunction with the throttling range adjustment to compensate the system for any changes in throttling range. This third element and the throttling range adjustment are usually ganged potentiometers. In electrical control systems, for example, a bridge is arranged having the sensor, a setpoint potentiometer and a compensating potentiometer (the third element). The control system further includes a throttling range potentiometer for adjusting the throttling range of the system. The throttling range potentiometer and the compensating potentiometer are operatively connected together such that any change in the throttling range potentiometer also results in a change in the compensating potentiometer to maintain the control point constant when changes in throttling range are made.

SUMMARY OF THE INVENTION

The simplified apparatus of the instant invention eliminates the need for an extra compensating potentiometer or compensating element by providing first and second relatively adjustable means with control point indicia, throttling range indicia, a control point pointer and a throttling range pointer associated with the first and second relatively adjustable means, a shaft extending from the first and second relatively adjustable means to the control point adjustment of the control system and a locking screw whereby the first and second relatively adjustable means may be locked together and both moved along with the shaft to effect changes in control point and wherein the first and second relatively adjustable means may be unlocked so that the first and second relatively adjustable means may be adjusted relative to one another to compensate for changes in throttling range by adjusting the control point adjustment but where the control point pointer continues to point to the same control point indicia.

BRIEF DESCRIPTION OF THE DRAWINGS

These and other features of the invention will become apparent from a detailed review of the drawings in which.

DETAILED DESCRIPTION OF THE DRAWINGS

Figure 1:
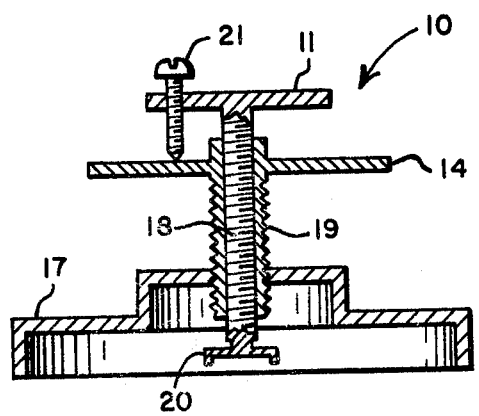
FIG. 1 is a cross-sectional side view of one form of the apparatus according to the invention.
Figure 2:
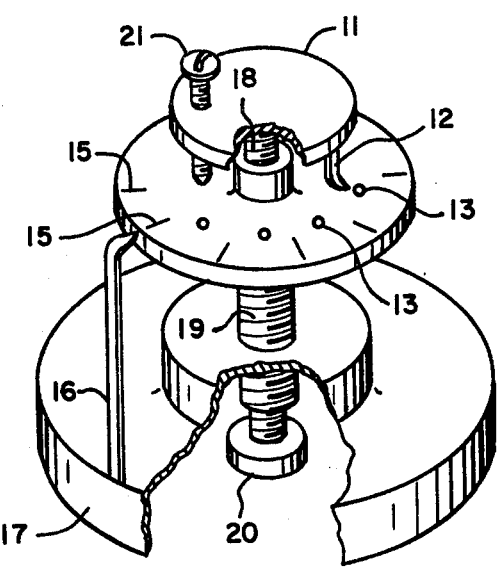
FIG. 2 is a pictorial view of the apparatus shown in FIG. 1.

In FIGS. 1 and 2, apparatus 10 comprises a first dial 11 which has throttling range pointer 12 attached thereto. The throttling range pointer 12 cooperates with throttling range indicia 13 located on second dial 14 which also has thereon control point indicia 15. A control point pointer 16 is attached to support 17 and cooperates with control point indicia 15.

Dial 11 is attached to threaded shaft 18 which extends through a threaded bore in shaft 19. Shaft 19 is attached to dial 14 and shaft 19 is also threaded around its outer circumference and cooperates with a threaded hole in support 17. Shaft 18 has disc 20 connected thereto. Locking screw 21 extends through a threaded hole in dial 11 and buts against dial 14 to lock dials 11 and 14 together.

Figure 5:
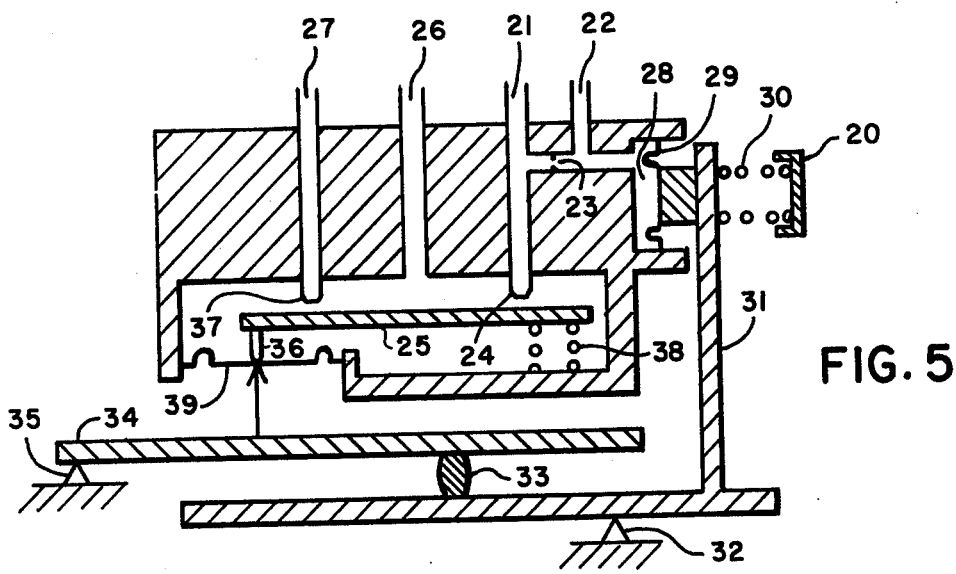
FIG. 5 shows a pneumatic controller which may be operated in conjunction with the apparatus of this invention.
Figure 6:
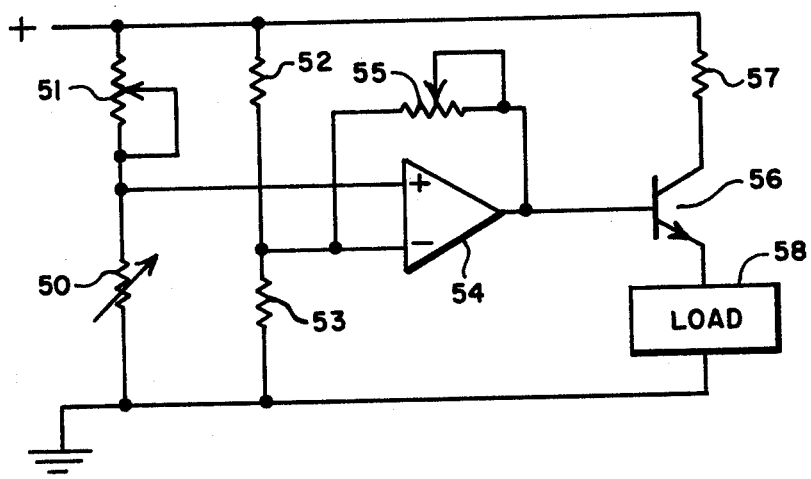
FIG. 6 shows an electrical controller which may be operated in conjunction with the apparatus of this invention.

The apparatus shown in FIGS. 1 and 2 may be used in conjunction with condition control systems such as those shown in FIGS. 5 and 6. In FIG. 5, a system is shown which is a simplified representation of the RP908 pneumatic control manufactured by Honeywell Inc. In FIG. 5, main pressure may be supplied to port 21 and a bleed type pneumatic sensor, such as a thermostat may be connected to port 22. Port 21 is connected to port 22 through a restriction 23 and is also connected to nozzle 24 which operates in conjunction with flapper 25. Branch pressure is derived from port 26 and port 27 is connected to exhaust. A pressure is established in sensor chamber 28 dependent upon the condition sensed by the sensor connected to port 22. This pressure acts against diaphragm 29 on one side and on the other side of the diaphragm the control point force is exerted through the disc 20 which may be the same as the disc 20 in FIGS. 1 and 2. Disc 20 operates through spring 30 against the main lever 31. Thus, the setpoint force or control point adjustment exerted by spring 30 acts through the main lever 31 to apply a force to diaphragm 29 operating against the pressure within chamber 28.

The difference in the force applied to lever 31 by the condition as sensed by the sensor connected to port 22 and applied to diaphragm 29 by the pressure within chamber 28 and the force applied to diaphragm 29 by spring 30 is applied to lever 31 to rotate it about fixed pivot point 32. The rotation of main lever 31 is applied through throttling range adjustment 33 to throttling range lever 34 which rotates about fixed pivot 35. Rotation of the throttling range lever 34 operates flapper 25 through flapper operating arm 36. The flapper 25 operates about spring 38 in conjunction with nozzle 24 and nozzle 37 to establish a branch pressure in port 26 which is then used to control a load or operator to adjust the condition of the space or load sensed by the sensor connected to port 22. The branch pressure will change until it balances, through levers 25, 31 and 34, the forces exerted on diaphragm 29 by spring 30 and the pressure within chamber 28.

It will be seen that the force on diaphragm 39, caused by the branch pressure, acts on diaphragm 29 through the lever system. This force will vary with throttling range adjustment. The proper adjustment of throttling range dial 11 will compensate for this variation.

Figure 4:
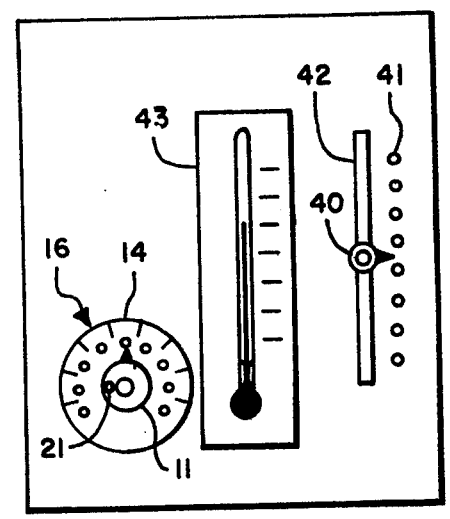
FIG. 4 is another form for a panel of a controller incorporating the invention.

The system shown in FIG. 5 may be housed in a control box the front panel of which may take the form of that shown in FIG. 4. This control box may comprise, in part, the support 17. On the front panel is a slider knob 40 which is operatively connected to the throttling range adjustment 33 of FIG. 5. The knob 40 has a pointer thereon which cooperates with throttling range indicia 41 and knob 40 may be adjusted in slideway 42 for adjusting throttling range adjustment 33 to establish the throttling range of the system. The apparatus shown in FIGS. 1 and 2 is also shown in FIG. 4 and includes dial 11, dial 14, locking screw 21 and the control point pointer 16. A condition indicator 43 may also be provided to indicate the present condition of the load being sensed.

Assuming that the operator desires to change the throttling range of the system, he merely (a) slides knob 40 to the new throttling range, (b) unscrews screw 21 to unlock dials 11 and 14, (c) rotates dial 11 until throttling range pointer 12 points to the same throttling range indicia 13 which the pointer on knob 40 indicates with respect to throttling range indicia 41 while maintaining control point pointer 16 pointing to the same control point indicia and (d) tightens screw 21 to lock discs 11 and 14 together. As dial 11 is rotated, it moves disc 20 in either direction for changing the force applied to main lever 31 by spring 30. Thus, the control point or setpoint of the system is adjusted to compensate for the change in throttling range resulting from the change in position of the throttling range adjustment 33. The graduation of indicia 13 is arranged such that it compensates for the changes in throttling range adjustment.

FIG. 6 shows an electrical control system in which the apparatus of FIGS. 1 and 2 may be used. In FIG. 6, a condition sensor 50 is included in a bridge arrangement which also includes a setpoint or control point adjustment 51 and fixed resistors 52 and 53 all of which are connected between a positive source and ground, as shown. The junction of setpoint or control point adjustment 51 and sensor 50 is connected to the positive input terminal of amplifier 54 and the junction of fixed resistors 52 and 53 is connected to the negative input terminal of amplifier 54. The output of amplifier 54 is connected through a throttling range adjustment 55 to its negative input terminal and is also connected to the base electrode of transistor 56. The collector of transistor 56 is connected through a resistor 57 to the positive terminal of the source and the emitter electrode of transistor 56 is connected through the load 58 to ground or the reference terminal.

Figure 3:
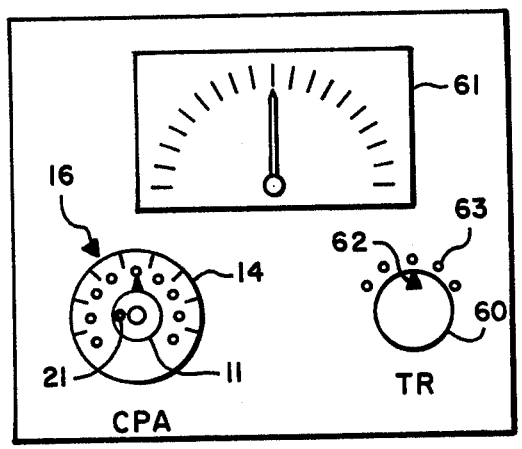
FIG. 3 is the front panel of a controller incorporating the invention.

When the apparatus of FIGS. 1 and 2 is used in conjunction with an electrical circuit such as that shown in FIG. 6, shaft 18 of the apparatus of FIGS. 1 and 2 is connected to the wiper arm of control point adjustment 51. The apparatus shown in FIG. 6 is housed in a control box the front panel of which may take the form of that shown in FIG. 3. A throttling range dial 60 may be operatively connected to the wiper arm of throttling range adjustment 55 and an indicator 61 may be provided to display the present condition sensed by sensor 50.

If a new throttling range for the control system shown in FIG. 6 is desired, dial 60 is rotated until its pointer 62 selects a new one of the throttling range indicia 63. Since the change in throttling range adjustment 55 affects the control point of the system, it is necessary to adjust control point adjustment 51 by (a) unlocking locking screw 21, (b) rotating dial 11 until throttling range pointer 12 points to the new one of the throttling range indicia 13 while maintaining the control point pointer 16 pointing to the same control point indicia 15 and (c) locking dial 11 and dial 14 together by tightening screw 21. Rotation of dial 11 rotates the shaft 18 to adjust the wiper of control point adjustment 51 which compensates for the change in the throttling range adjustment 55. Once the dials 11 and 14 are locked together, the control point of the system may be adjusted by adjusting dials 11 and 14 until pointer 16 points to the new control point indicia 15. Since the two dials are locked together, the rotation of dial 14 results in rotation of dial 11 and, thereby, rotation of shaft 18 to adjust control point adjustment 51.

Figure 7:
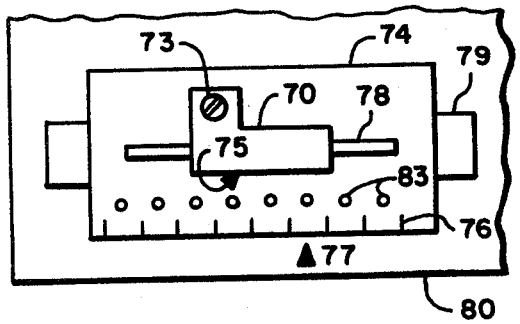
FIG. 7 shows another form which the invention may take.
Figure 8:
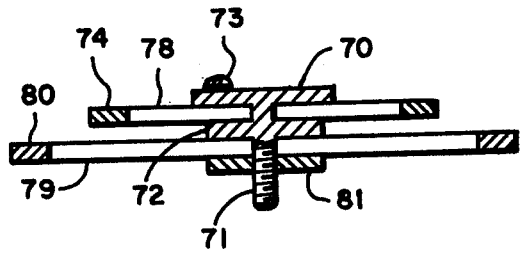
FIG. 8 is a cross-sectional view of the apparatus shown in FIG. 7.

FIGS. 7 and 8 show an alternative structure to the apparatus shown in FIGS. 1 and 2. In FIGS. 7 and 8, slider 70 is attached to shaft 71 and shaft 71 has a flange 72 such that, when the screw 73 is tightened, slider 70 will be held or locked tightly to slider 74.

Slider 70 has throttling range pointer 75 thereon which cooperates with throttling range indicia 83 on slider 74 and also on slider 74 is control point indicia 76 for cooperating with control point pointer 77.

Shaft 71 extends through slot 78 in slider 74 and also through slot 79 in the front of a control panel or housing 80. Nut 81 may be provided to secure the slider 70 and slider 74 assembly to the panel front 80 but yet allow for sliding motion of the slider 70-slider 74 combination with respect to the panel 80. Other devices may be used instead of nut 81 to secure this slider assembly to the panel and the flange 72 may also take other forms to allow the slider 70 to be secured with respect to the slider 74 when the screw 73 is tightened.

Shaft 71 may be suitably connected to the setpoint mechanism in the control system for adjusting the setpoint or control point of the control system. When the throttling range is adjusted by a mechanism such as dial 60 in FIG. 3 or slider or knob 40 in FIG. 4, screw 73 of FIGS. 7 and 8 is loosened and throttling range slider 70 is adjusted until pointer 75 points to the new throttling range indicia 83 while maintaining pointer 77 pointing to the same control indicia 76. The motion of the shaft 71 will then adjust the control point of the system to compensate for the change in throttling range. At this point, the screw 73 can be tightened to lock the sliders 70 and 74 together. Thereafter, changes in control point can be effected by sliding the slider 74 so that the pointer 77 points to the new control point indicia 76. Because slider 74 is locked to slider 70, the shaft 71 will also move to adjust the control point adjustment to the new setting.

As can be seen, certain modifications of the invention can be made without departing from the scope of the invention. Therefore, the invention is to be limited only by the scope of the appended claims.

The embodiments of the invention in which an exclusive property or right is claimed are defined as follows:

1. In a condition control system for controlling a load in accordance with a sensed condition, said system having both throttling range adjustment means for adjusting the throttling range of the system and control point adjustment means for establishing a control point for said system, an apparatus for compensating for changes in control point upon adjustment of said throttling range adjustment means by adjusting the control point adjustment means accordingly, said apparatus comprising:

first and second relatively adjustable means and support means, said first and second relatively adjustable means adjustable with respect to said support means, control point indicia affixed to one of said second relatively adjustable means and said base means and a control point pointer affixed to the other of said second relatively adjustable means and said base means, throttling range indicia affixed to one of said first and second relatively adjustable means and a throttling range pointer affixed to the other of said first and second relatively adjustable means, whereby said second relatively adjustable means may be adjusted until said control point pointer points to one of said control point indicia and said first relatively adjustable means may be adjusted until said throttling range pointer points to one of said throttling range indicia;

shaft means connected to at least one of said first and second relatively adjustable means and to said control point adjustment means; and, locking means for locking said first and second relatively adjustable means together whereby, upon changes in throttling range, said locking means may be unlocked and said one of said first and second relatively adjustable means may be adjusted relative to the other of said first and second relatively adjustable means so that the throttling range pointer points to the new throttling range whereby said shaft means is moved to in turn adjust the control point adjustment means to compensate for changes in throttling range, and thereafter the locking means may lock the first and second relatively adjustable means together.

2. The apparatus of claim 1 wherein said shaft means is connected to said first relatively adjustable means whereby, upon changes in throttling range, said locking means may be unlocked and said first relatively adjustable means may be adjusted so that the throttling range pointer points to the new throttling range whereby the shaft means is moved to in turn adjust the control point adjustment means and thereafter the locking means may lock the first and second relatively adjustable means together to effect any subsequently desired change in control point.

3. The apparatus of claim 2 wherein said first relatively adjustable means comprises a dial having said throttling range pointer attached thereto and said second relatively adjustable means comprises a second dial having thereon said throttling range indicia for cooperating with said throttling range pointer and said control point indicia for cooperating with said control point pointer, said control point pointer affixed to said base means.

4. The apparatus of claim 3 wherein said shaft means comprises a first threaded shaft fixedly attached to said first dial and a second threaded shaft fixedly attached to said second dial, said second threaded shaft having a threaded bore therein to receive said first threaded shaft, and said base means having a threaded bore therein for receiving said second threaded shaft wherein said first threaded shaft is connected to said control point adjusting means.

5. The apparatus of claim 4 wherein said locking means comprises a threaded screw extending through a threaded bore in said first dial and, in said locking position, but against said second dial for locking said first dial to said second dial.

6. The apparatus of claim 1 wherein said first relatively adjustable means comprises a first dial having said throttling range pointer attached thereto and said second relatively adjustable means comprises a second dial having thereon said throttling range indicia for cooperating with said throttling range pointer and said control point indicia for cooperating with said control point pointer, said control point pointer being affixed to said base means.

7. The apparatus of claim 6 wherein said shaft means comprises a first threaded shaft fixedly attached to said first dial and a second threaded shaft fixedly attached to said second dial, said second threaded shaft having a threaded bore therein to receive said first threaded shaft, and said base means having a threaded bore therein for receiving said second threaded shaft wherein said first threaded shaft is connected to said control point adjusting means.

8. The apparatus of claim 1 wherein said locking means comprises a threaded locking screw extending through a threaded bore of said first relatively adjustable means and butting against said second relatively adjustable means for locking said first and second relatively adjustable means together.

* * * * *